(12) United States Patent
Kim (10) Patent No.: US 7,734,938 B2
(45) Date of Patent: Jun. 8, 2010

(54) SYSTEM AND METHOD OF CONTROLLING POWER CONSUMPTION

(75) Inventor: Ji-Hyung Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 735 days.

(21) Appl. No.: 11/604,250

(22) Filed: Nov. 27, 2006

(65) Prior Publication Data
US 2007/0124621 A1 May 31, 2007

(30) Foreign Application Priority Data
Nov. 25, 2005 (KR) ............... 10-2005-0113651

(51) Int. Cl.
*G06F 1/32* (2006.01)
*G06F 13/00* (2006.01)
(52) U.S. Cl. .................. 713/320; 713/300; 710/100; 370/463
(58) Field of Classification Search ........... 713/300, 713/320; 370/463; 710/100
See application file for complete search history.

(56) References Cited

U.S. PATENT DOCUMENTS

| 7,249,271 | B2 * | 7/2007 | Shibata et al. | 713/324 |
|---|---|---|---|---|
| 2004/0128576 | A1 * | 7/2004 | Gutman et al. | 713/323 |
| 2005/0105545 | A1 * | 5/2005 | Thousand et al. | 370/442 |
| 2005/0144488 | A1 * | 6/2005 | Lee et al. | 713/300 |
| 2005/0160186 | A1 | 7/2005 | Ruiz | |
| 2005/0169356 | A1 * | 8/2005 | Matsumoto et al. | 375/220 |
| 2005/0188232 | A1 * | 8/2005 | Weng et al. | 713/320 |
| 2005/0201411 | A1 * | 9/2005 | Shibata et al. | 370/463 |
| 2005/0268010 | A1 * | 12/2005 | Igari | 710/100 |
| 2006/0069932 | A1 * | 3/2006 | Oshikawa et al. | 713/300 |

FOREIGN PATENT DOCUMENTS

| KR | 10-2002-0078380 | 10/2002 |
|---|---|---|
| KR | 10-2004-0057805 | 7/2004 |

\* cited by examiner

*Primary Examiner*—Thomas Lee
*Assistant Examiner*—Vincent T Tran
(74) *Attorney, Agent, or Firm*—Harness, Dickey & Pierce, P.L.C.

(57) ABSTRACT

A system and method of controlling power consumption are provided. The example method may be directed to controlling power consumption in a system including first and second interface blocks, and may include transitioning a first interface block to a power saving mode in response to a status of a first transmission channel, the first transmission channel configured to forward information from the first interface block to a second interface block and transitioning a second interface block to the power saving mode in response to a status of a second transmission channel, the second transmission channel configured to forward information from the second interface block to the first interface block. The example system may include a first interface block transitioning to a power saving mode in response to a status of a first transmission channel and a second interface block transitioning to the power saving mode in response to a status of a second transmission channel, the first transmission channel configured to forward information from the first interface block to the second interface block and the second transmission channel configured to forward information from the second interface block to the first interface block.

28 Claims, 11 Drawing Sheets

SYSTEM AND METHOD OF CONTROLLING POWER CONSUMPTION

PRIORITY STATEMENT

This U.S. non-provisional patent application claims priority under 35 U.S.C. §119 of Korean Patent Application 2005-113651 filed on Nov. 25, 2005, the entire contents of which are hereby incorporated by reference.

BACKGROUND OF THE INVENTION

1. Field of the Invention

Example embodiments of the present invention are related generally to a system and method thereof, and more particularly to a system and method of controlling power consumption.

2. Description of the Related Art

Low-voltage differential signaling (LVDS) may be employed in various fields of commercial applications. LVDS may refer to a type of interface standard for higher-speed data transmissions. For example, the ANSI/TIA/EIA-644-1995 standard may be an example LVDS standard which may define specifications for physical layers as electronic interface solutions. LVDS techniques including lower-voltage signals may increase bit rates, lower power consumption, and/or reduce noise in, for example, mobile communication stations, asynchronous transfer mode (ATM) switch applications, higher-resolution display devices, printers, digital copying machines, etc.

Internet applications may increasingly require higher amounts of data bandwidth. Furthermore, data streaming operations may be performed with higher bandwidth for digital video processing, higher-definition televisions and/or color graphic treatments. Conventionally, higher bandwidth data transmission systems may employ LVDS, which may allow higher data bandwidth (e.g., multi-gigabit data transmission) through copper-based interconnection via a higher-frequency analog circuit technology. Different versions of LVDS may include ground-referenced LVDS (GRLVDS) and bus LVDS (BLVDS), which may be deployed in bilateral and/or multi-drop schemes. GRLVDS may provide higher-frequency data communication with lower voltages by making differential and common mode signals swing near to a ground voltage level. Generally, LVDS, BLVDS and GRLVDS may represent examples of serial interfaces.

SUMMARY OF THE INVENTION

An example embodiment of the present invention is directed to a method of controlling power consumption in a system including first and second interface blocks, including transitioning a first interface block to a power saving mode in response to a status of a first transmission channel, the first transmission channel configured to forward information from the first interface block to a second interface block and transitioning a second interface block to the power saving mode in response to a status of a second transmission channel, the second transmission channel configured to forward information from the second interface block to the first interface block.

Another example embodiment of the present invention is directed to a system, including a first interface block transitioning to a power saving mode in response to a status of a first transmission channel and a second interface block transitioning to the power saving mode in response to a status of a second transmission channel, the first transmission channel configured to forward information from the first interface block to the second interface block and the second transmission channel configured to forward information from the second interface block to the first interface block.

BRIEF DESCRIPTION OF THE DRAWINGS

The accompanying drawings are included to provide a further understanding of the invention, and are incorporated in and constitute a part of this specification. The drawings illustrate example embodiments of the present invention and, together with the description, serve to explain principles of the present invention.

DETAILED DESCRIPTION OF EXAMPLE EMBODIMENTS OF THE PRESENT INVENTION

Detailed illustrative example embodiments of the present invention are disclosed herein. However, specific structural and functional details disclosed herein are merely representative for purposes of describing example embodiments of the present invention. Example embodiments of the present invention may, however, be embodied in many alternate forms and should not be construed as limited to the embodiments set forth herein.

Accordingly, while example embodiments of the invention are susceptible to various modifications and alternative forms, specific embodiments thereof are shown by way of example in the drawings and will herein be described in detail. It should be understood, however, that there is no intent to limit example embodiments of the invention to the particular forms disclosed, but conversely, example embodiments of the invention are to cover all modifications, equivalents, and alternatives falling within the spirit and scope of the invention. Like numbers may refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. Conversely, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
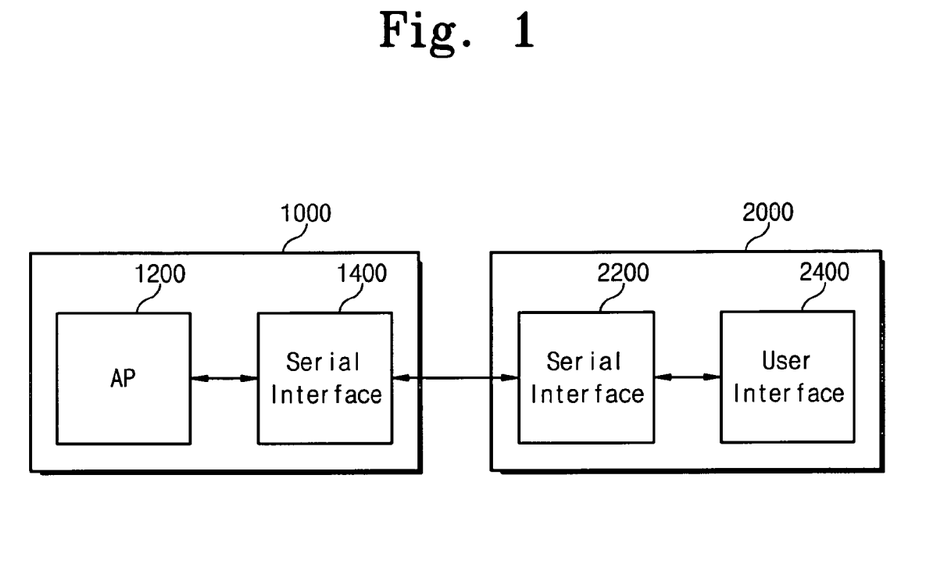
FIG. 1 is a block diagram illustrating a first sub-system and a second sub-system according to an example embodiment of the present invention.

FIG. 1 is a block diagram illustrating a first sub-system 1000 and a second sub-system 2000 according to an example embodiment of the present invention. In the example embodiment of FIG. 1, first and second sub-systems 1000 and 2000 may communicate via a serial interface. In an example, the serial interface may conform with lower-voltage differential signaling (LVDS) standards for interfacing with higher-frequency data transmission. However, it will be appreciated by one of ordinary skill in the art that other well-known serial interfaces may also be used (e.g., bus LVDS (BLVDS), ground referenced LVDS (GRLVDS), etc.)

In the example embodiment of FIG. 1, the first sub-system 1000 may include an application processor (AP) 1200 and a first serial interface block 1400. The second sub-system 2000 may include a second serial interface block 2200 and a user interface block 2400. In the first sub-system 1000, the first serial interface block 1400 may transform parallel data, provided from the AP 1200, into serial data, and may output the serial data to the second sub-system 2000 in accordance with a given serial interface protocol (e.g., LVDS). The first serial interface block 1400 may also transform serial data, provided from the second sub-system 2000, into parallel data, and may output the parallel data to the AP 1200. In the second sub-system 2000, the second serial interface block 2200 may transform serial data, transferred from the first sub-system 1000, into parallel data, and may output the parallel data to the user interface block 2400. The user interface block 2400 may process the data output from the second serial interface block 2200 (e.g., for output to a user). In an example, the user interface block 240 may include a display such a liquid crystal display (LCD) unit, a speaker for outputting audio signals, etc.

While not shown in FIG. 1, if the system of FIG. 1 is embodied as a portable device, such as a mobile phone or a notebook computer, the first sub-system 1000 may be supplied with power via a power supply unit (e.g., a battery) (not shown). The second sub-system 2000 may likewise be supplied with power from the power supply unit of the first sub-system 1000. Generally, if batteries are used, it may be desirable to reduce standby power so as to increase an operating time of portable devices between charges. In order to reduce standby power, the system of FIG. 1 may be configured to selectively engage a power saving mode (e.g., in a standby or inactive mode), as will now be described in greater detail with respect to example embodiments of the present invention.

Figure 2:
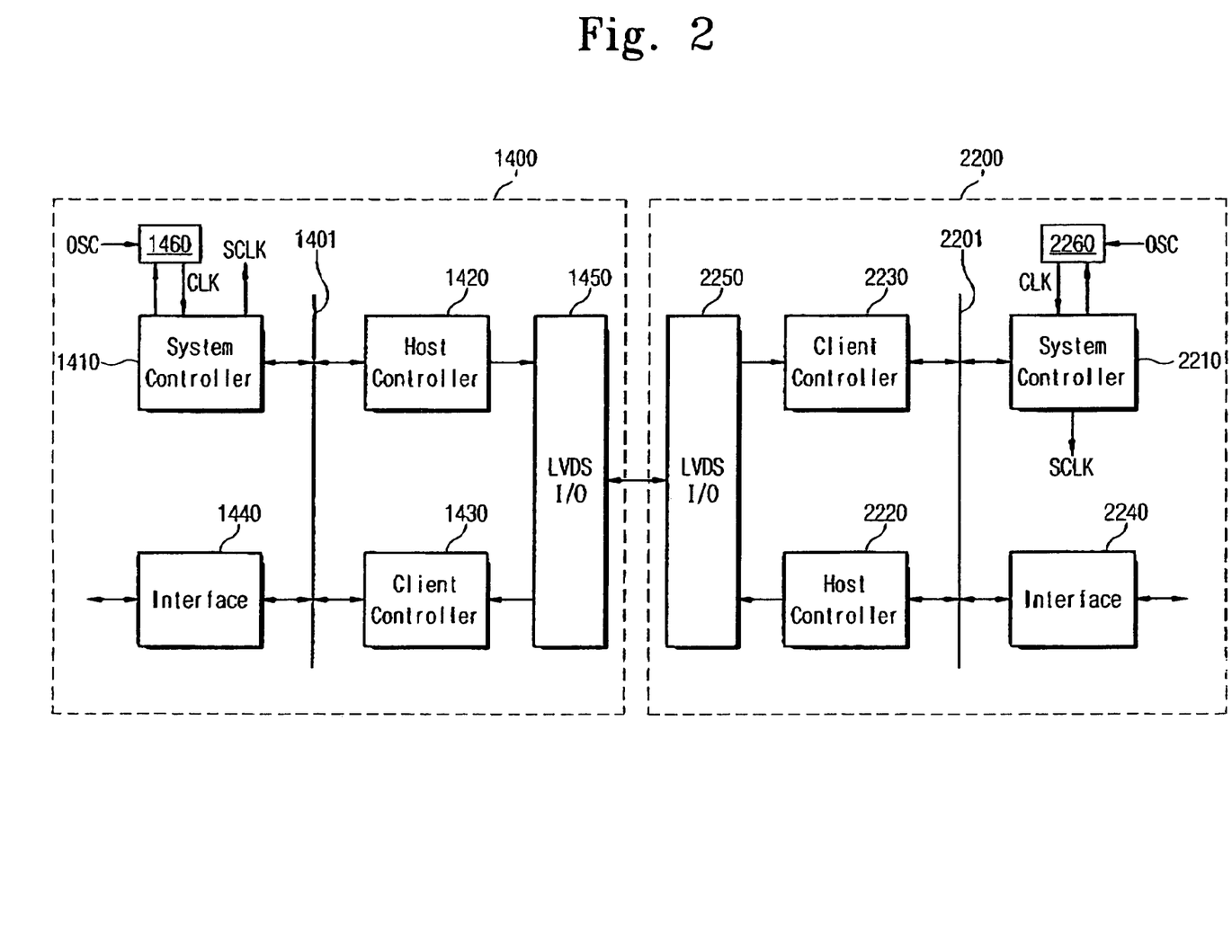
FIG. 2 is a block diagram illustrating first and second serial interface blocks of the first and second sub-systems, respectively, of FIG. 1 according to another example embodiment of the present invention.

FIG. 2 is a block diagram illustrating the first and second serial interface blocks 1400 and 2200 of the first and second sub-systems 1000 and 2000, respectively, of FIG. 1 according to another example embodiment of the present invention.

In the example embodiment of FIG. 2, the serial interface block 1400 of the first sub-system 1000 may include a system controller 1410, a host controller 1420, a client controller 1430, an interface unit 1440, and a LVDS input/output (I/O) unit 1450. In an example, the system controller 1410, the host controller 1420, the client controller 1430, and the interface unit 1440 may be configured so as to communicate with each other via bus 1401. While not illustrated in the example embodiment of FIG. 2, the system controller 1410, the host controller 1420, and the client controller 1430 may each include one or more registers for storing information.

In the example embodiment of FIG. 2, the system controller 1410 may be configured to supply a system clock signal SCLK to components of the serial interface block 1400 in response to a clock signal CLK provided from a clock generator 1460. The clock generator 1460 may be regulated by the system controller 1410 in operation, and may supply the clock signal CLK to the system controller 1410 in response to an oscillation signal OSC provided from an external device (e.g., a crystal oscillator. Methods of outputting the clock signal CLK, at the clock generator 1460, with a given duty ratio from the oscillation signal OSC will be easily understood by one of ordinary skill in the art, and will not be described further for the sake of brevity.

In the example embodiment of FIG. 2, the host controller 1420 may include a link layer module for processing signals to be transferred through the LVDS I/O unit 1450. The host controller 1420 may convert data (e.g., scheduled to be transferred through the LVDS I/O unit 1450) into packet data. The client controller 1430 may also include a link layer module for processing signals to be transferred through the LVDS I/O unit 1450. The client controller 1430 may restore the packet data transferred through the LVDS I/O unit 1450. The interface unit 1440 may provide an interface operation with the AP 1200. In addition, the interface unit 1440, although not shown in the example embodiment of FIG. 2, may interface with a central processing unit (CPU), may perform an RGB mode, and/or may interface with a camera system. The LVDS I/O 1450 may include a physical layer module which may transform serial packet data (e.g., "parallel" data) of the host controller 1420 into serial packet data (e.g., "serial" data) and may transform serial packet data of the second sub-system 2000 into parallel packet data.

In the example embodiment of FIG. 2, the serial interface block 2200 of the second sub-system 2000 may include a system controller 2210, a host controller 2220, a client controller 2230, an interface unit 2240, and a LVDS I/O unit 2250. In an example, the system controller 2210, the host controller 2220, the client controller 2230, and the interface unit 2240 may be configured so as to communicate with each other via bus 2201. While not shown in the example embodiment of FIG. 2, the system controller 1410, the host controller 1420, and the client controller 1430 may each include one or more registers for storing information.

In the example embodiment of FIG. 2, the system controller 2210 may be configured to supply a system clock signal SCLK to components of the serial interface block 2200 in response to a clock signal CLK provided from a clock generator 2260. The clock generator 2260 may be regulated by the system controller 2210 and may supply the clock signal CLK to the system controller 2210 in response to an oscillation signal OSC provided from an external device (e.g., the crystal oscillator supplying the oscillation signal to the first serial interface block 1400). The host controller 2220 may include a link layer module for processing signals scheduled to be transferred through the LVDS I/O unit 2250. The host controller 2220 may convert data, scheduled to be transferred through the LVDS I/O unit 2250, into packet data. The client controller 2230 may also include a link layer module for processing signals scheduled to be transferred through the LVDS I/O unit 2250. The client controller 2230 may restore the packet data transferred through the LVDS I/O unit 2250. The interface unit 2240 may interface with the user interface block 2400. In addition, the interface unit 2240, although not shown in the example embodiment of FIG. 2, may interface with a central processing unit (CPU), may perform an RGB mode, and/or may interface with a camera system. The LVDS I/O 2250 may include a physical layer module which may transform serial packet data (e.g., "parallel" data) of the host controller 2220 into serial packet data (e.g., "serial" data) and may transform serial packet data of the second sub-system 1000 into parallel packet data.

Figure 3:
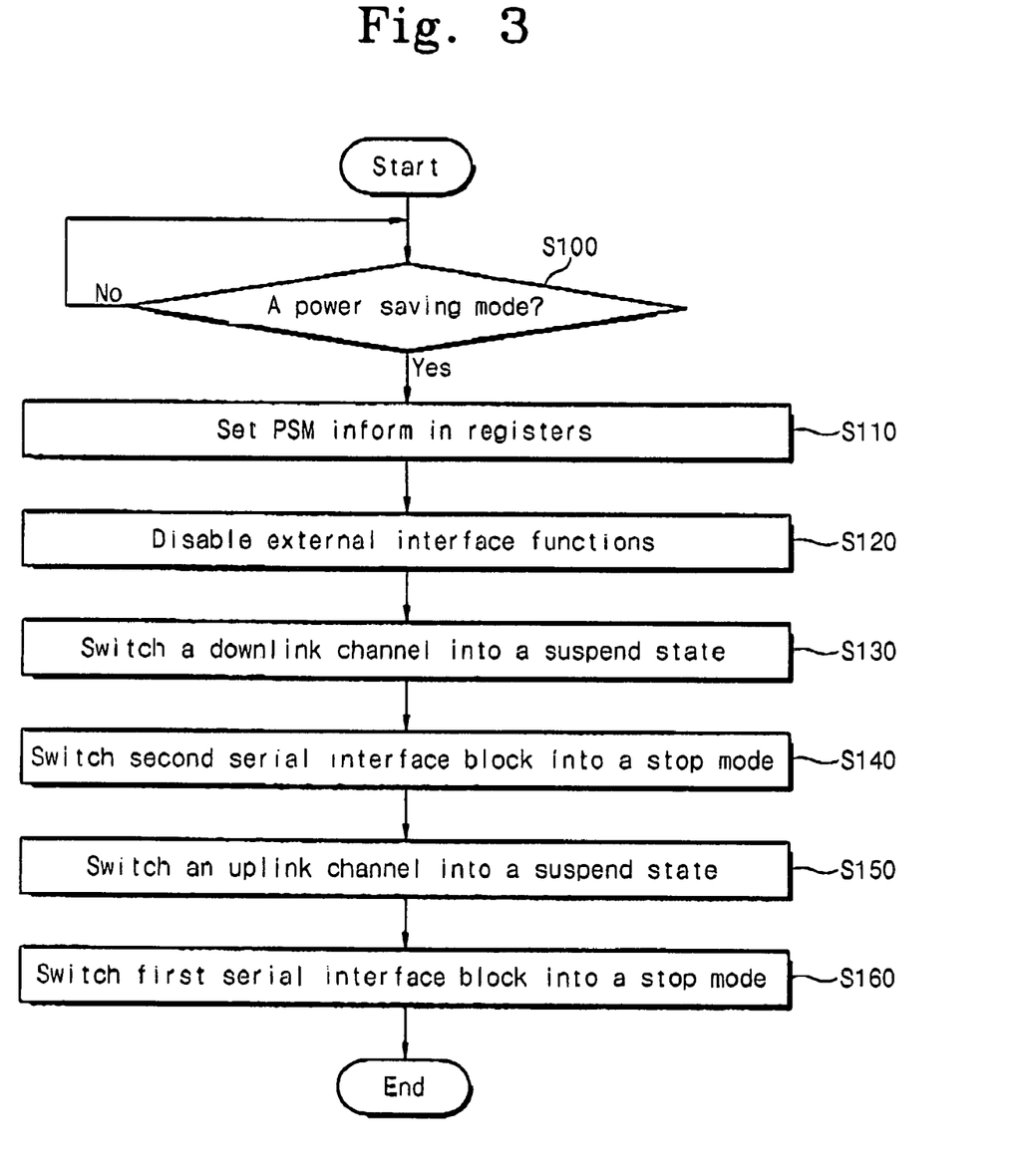
FIG. 3 is a flow chart illustrating a process of establishing a power saving mode according to another example embodiment of the present invention.
Figure 4A:
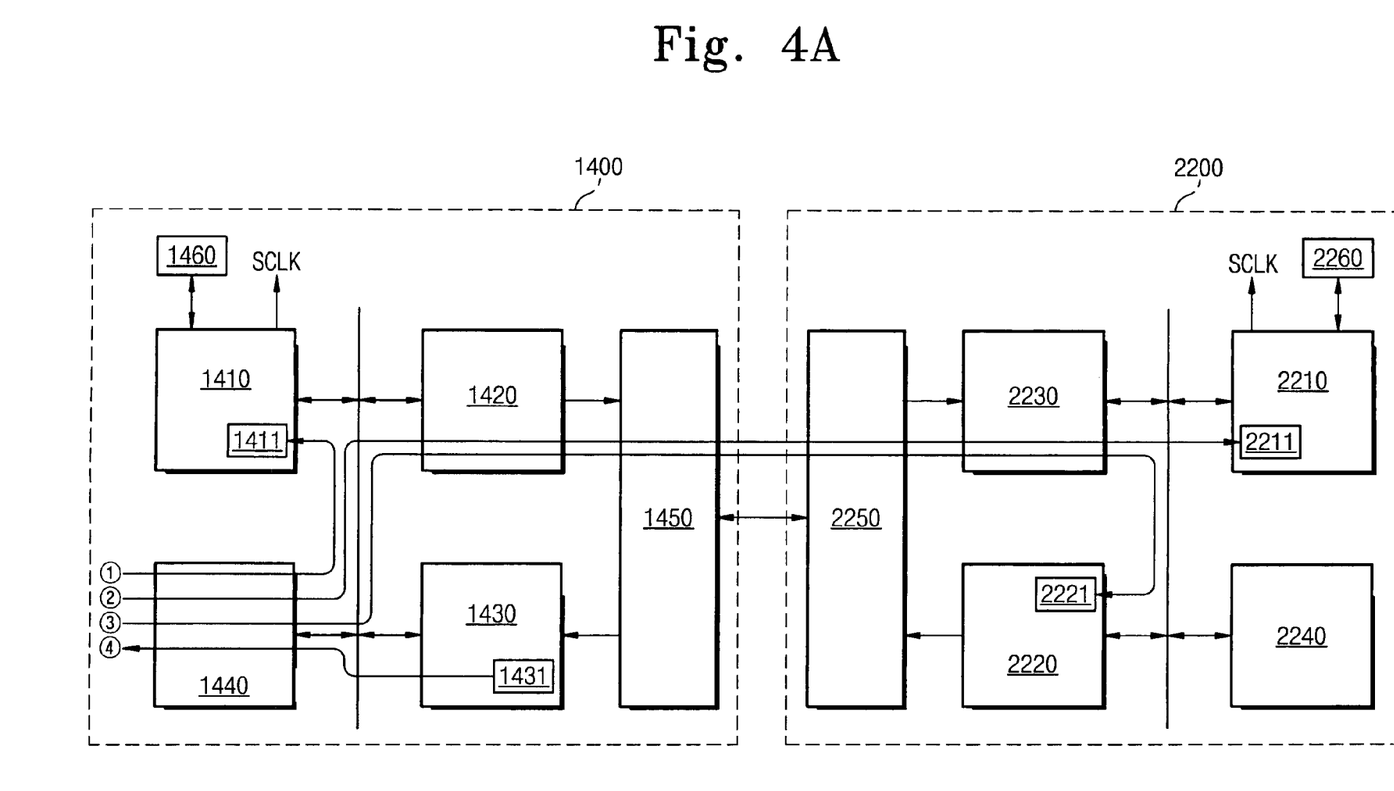
FIGS. 4A and 4B are block diagrams illustrating flows of control operations between serial interface blocks during the process of FIG. 3 according to other example embodiments of the present invention.
Figure 4B:
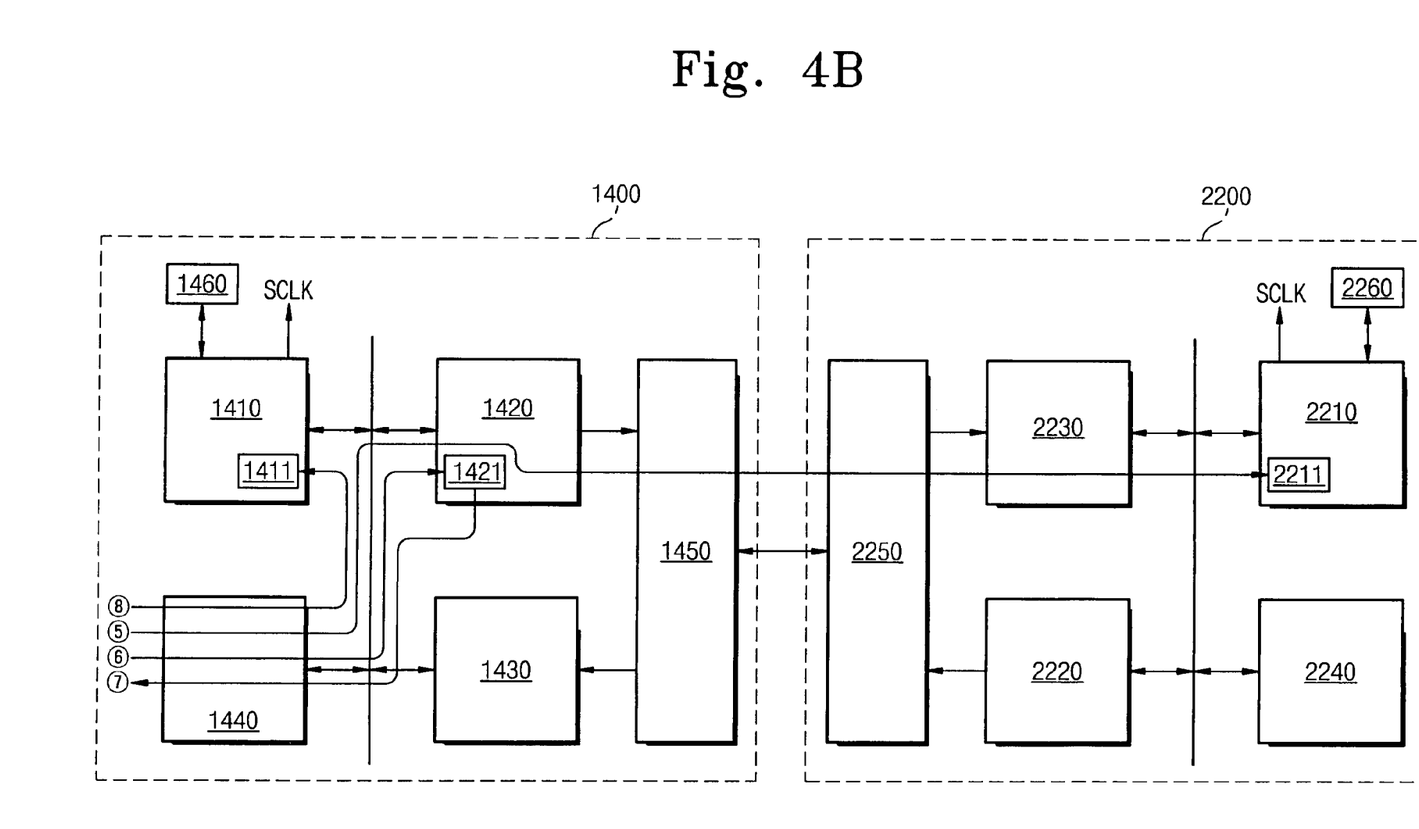

FIG. 3 is a flow chart illustrating a process of establishing a power saving mode according to another example embodiment of the present invention. FIGS. 4A and 4B are block diagrams illustrating flows of control operations between serial interface blocks 1400 and 2200 during the process of FIG. 3 according to other example embodiments of the present invention.

In the example embodiment of FIG. 3, the AP 1200 of the first sub-system 1000 may determine whether to initiate a power saving mode (at S100). For example, the power saving mode may be triggered by an idle state (e.g., a given period where no user inputs have been received or no data is scheduled for processing). If the first sub-system 1000 does not determine to initiate the power saving mode, the process of FIG. 3 may not trigger the power saving mode.

In the example embodiment of FIGS. 3 and 4A, if the first sub-system 1000 determines to initiate the power saving mode, the AP 1200 may store triggering information in the registers 1411 and 2211 of the system controllers 1410 and 2210 to trigger the power saving mode, respectively, via signal paths ① and ② shown in the example embodiment of FIG. 4A (at S110). Here, the triggering information for the power saving mode may include information related to whether to enable or disable the clock generators 1410 and 2210, as well as information related to whether to enable or disable detecting functions of the LVDS I/O units 1450 and 2250.

In the example embodiment of FIG. 2, the AP 1200 may disable external interface functions of the first and second serial interface blocks 1400 and 2200 (at S120). For example, the AP 1200 may disable functions for interfacing with external units, among the interface functions provided by the interface unit 1440 of the first serial interface block 1400 (e.g., an RGB interface, a camera interface, etc.). Also, the AP 1200 may disable functions for interfacing with external units, among the interface functions provided by the interface unit 2240 of the second serial interface block 2200 (e.g., an RGB interface, a camera interface, etc.). Further, an interface with the AP 1200 provided by the first serial interface block 1400 and a General Purpose Input/Output (GPIO) interface function provided by the second serial interface block 2400 may not be disabled.

In the example embodiment of FIG. 2, a transmission channel from the second sub-system 2000 toward the first sub-system 1000 (hereinafter, referred to as 'downlink channel') may transition into a suspension state (at S130). For example, the AP 1200 may set a register 2221 (e.g., in the host controller 2220 of the second sub-system 2000) to the suspension state via a signal path ③ illustrated in the example embodiment of FIG. 4A. As used herein, a suspension state may refer to a condition where a driver output may be set to a higher impedance (Hi-Z) by interrupting a driver function in a component thereof. Thus, in an example, an output of the host controller 2220 of the second serial interface block 2200 may be set to the higher impedance state. Thereafter, the client controller 1430 of the first serial interface block 1400 may detect whether the host controller 2220 of the second serial interface unit 2200 is set to the suspension state. The transition to the suspension state may be detected by checking whether, through input/output blocks, an output of the host controller 2220 is set to the higher impedance.

In the example embodiment of FIG. 2, if the higher impedance at the host controller 2220 is detected, the client controller 1430 may establish a suspension state bit in the register 1431 to indicate that the downlink channel (e.g., the transmission channel from the second sub-system 2000 to the first sub-system 1000) may be in the suspension state. The AP 1200 may evaluate the suspension state bit from the register 1431 of the client controller 1430 via a signal path ④ as shown in the example embodiment of FIG. 4A. If the suspension state bit indicates that the downlink channel is in the suspension state, the serial interface block 2200 of the second sub-system 2000 may be set into the power saving mode by control of the AP 1200. Accordingly, the register 2211 of the system controller 2210 may be set into the power saving mode via a signal path ⑤, as shown in the example embodiment of FIG. 5. If the register 2211 of the system controller 2210 transitions into the power saving mode, the system clock signal SCLK, which may be supplied to components of the serial interface block 2200, may be interrupted or disabled in accordance with the power saving mode information stored in the register 2211 (at S140).

In another example embodiment of the present invention, referring to FIG. 2, a current condition of the downlink channel, whether or not the suspension state is set, may be sensed in a number of ways. For example, if the register 2221 of the host controller 2220 includes bit information indicating the suspension state, the host controller 2210 may provide the AP 1200, through the interface unit 2240 (e.g., a GPIO interface function of the interface unit 2240) with a flag signal that indicates that the downlink channel in the suspension state.

Here, the AP 1200 may set the serial interface block 2200 of the second sub-system 2000 into the power saving mode in a manner similar as that described above.

In the example embodiment of FIG. 2, the register 2211 may store information for disabling the clock generator 2260, and the system controller 2210 may stop, or pause, generating the clock signal CLK in the power saving mode. Thus, there may be no generation of the system clock signal SCLK during the power saving mode. In contrast, if the register 2211 stores information for enabling the clock generator 2260, the system controller 2210 may stop generating the system clock signal SCLK while the clock generator 2260 may still be active.

In the example embodiment of FIG. 2, after the second serial interface block 2200 transitions to the power saving mode, a transmission channel from the first sub-system 1000 to the second sub-system 2000 (hereinafter, referred to as 'uplink channel') may transition into a suspension state by control of the AP 1200 (at S150). For example, the AP 1200 may set a register 1421, which is included in the host controller 1420 of the second sub-system 1000, into the suspension state via a signal path ⑥ shown in FIG. 4B. As discussed above, the suspension state may refer to a condition where a driver output may transition to a higher impedance (Hi-Z) by interruption of a driver function in the component thereof. Thus, an output of the host controller 1420 of the second serial interface block 1400 may transition to the higher impedance state.

In the example embodiment of FIG. 2, the host controller 1420 may set a suspension state bit in the register 1421 to indicate that the uplink channel (e.g., the transmission channel from the first sub-system 1000 to the second sub-system 2000) may be in the suspension state. The AP 1200 may detect the suspension state bit from the register 1421 of the host controller 1420 via a signal path ⑦ as shown in the example embodiment of FIG. 4B. If the suspension state bit indicates that the uplink channel is in the suspension state, the first serial interface block 1440 may be transitioned into the power saving mode by control of the AP 1200 (at S160). Thus, the register 1411 of the system controller 1410 may transition into the power saving mode via a signal path ⑧. If the register 1411 of the system controller 1410 is transitioned into the power saving mode, the system clock signal SCLK, which may be supplied to components of the serial interface block 1400, may be interrupted or paused, in compliance with the power saving mode information stored in the register 1411. The interruption of the system clock signal SCLK may be performed in the same manner as discussed above, and as such will not be further described for the sake of brevity.

In the example embodiment of FIG. 2, the serial interface blocks 1400 and 2200 may transition into the power saving mode so as to reduce standby power consumption of the sub-systems 1000 and 2000, which may communicate with each other over a serial interface. However, under certain triggering conditions, the serial interface blocks 1400 and 2200 may have to be "released" from the power saving mode (e.g., to re-enter an "active" mode again). For example, it may be permissible to release the power saving mode of the serial interface blocks 1400 and 2200 through the first sub-system 1000 (e.g., in response to a triggering condition detected thereof). In another example, it may also be permissible to release the power saving mode of the serial interface blocks 1400 and 2200 through the second sub-system 2000 (e.g., in response to a triggering condition detected thereof). Below, example embodiments are directed generally to where the triggering condition is detected at the second sub-system 2000. However, it will be appreciated that such a description is for example purposes only, and other example embodiments may trigger a release from the standby or power saving mode upon a triggering condition detected at the first sub-system 1000.

Figure 5:
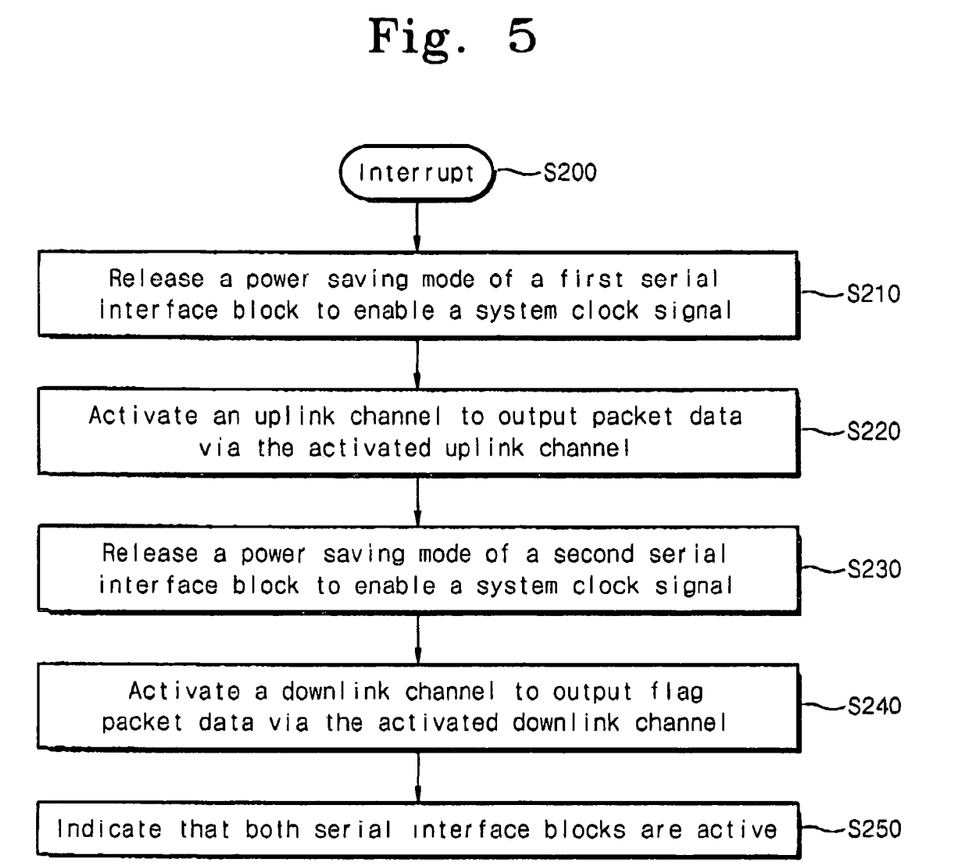
FIG. 5 is a flow chart illustrating a process of releasing a power saving mode according to another example embodiment of the present invention.

FIG. 5 is a flow chart illustrating a process of releasing the power saving mode according to another example embodiment of the present invention.

Figure 6:
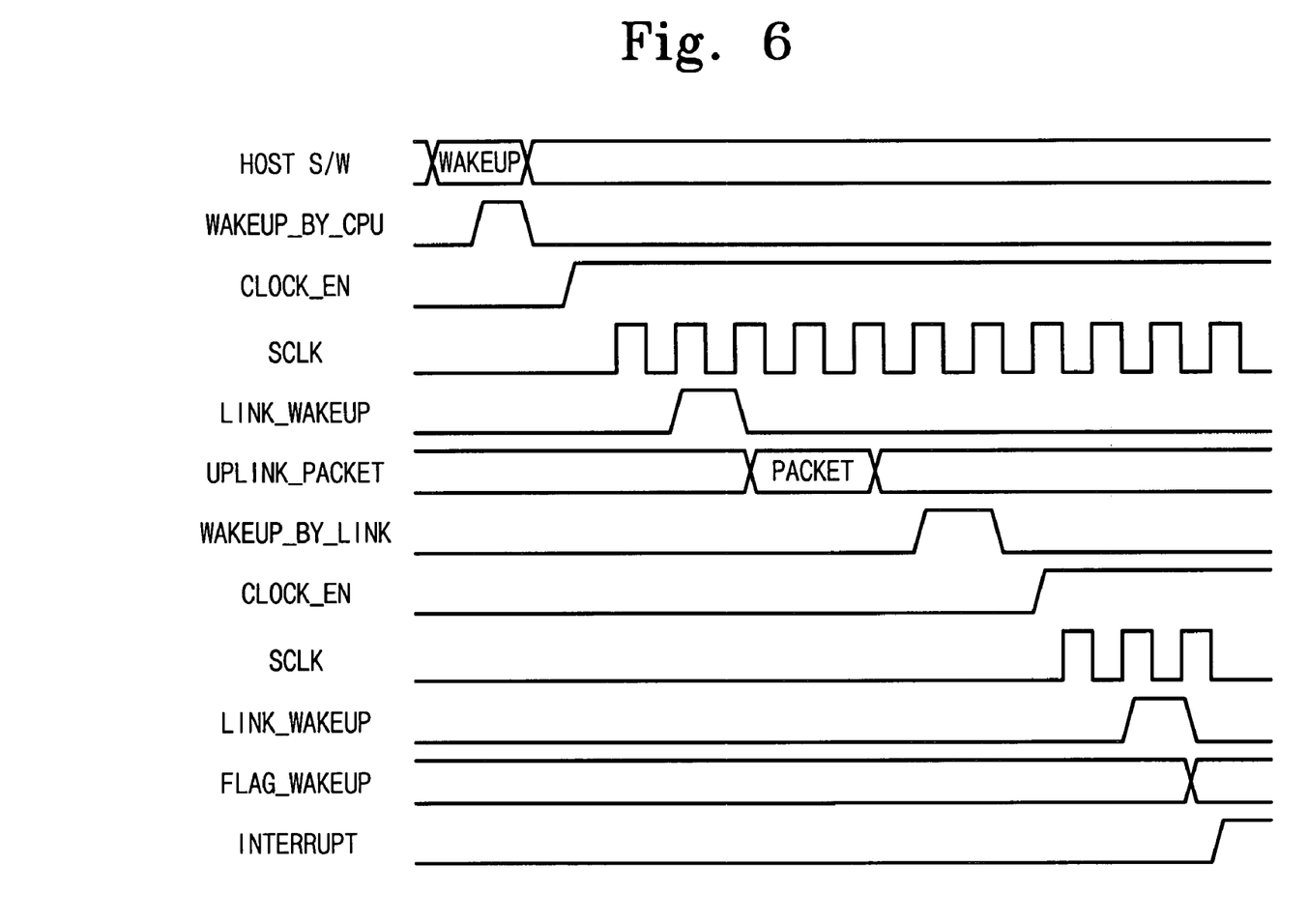
FIG. 6 is a timing diagram illustrating signal state transitions for signals during the process of FIG. 5 according to another example embodiment of the present invention.

FIG. 6 is a timing diagram illustrating signal state transitions for signals within the first and second serial interface blocks 1400 and 2200 during the process of FIG. 5 according to another example embodiment of the present invention.

Figure 7:
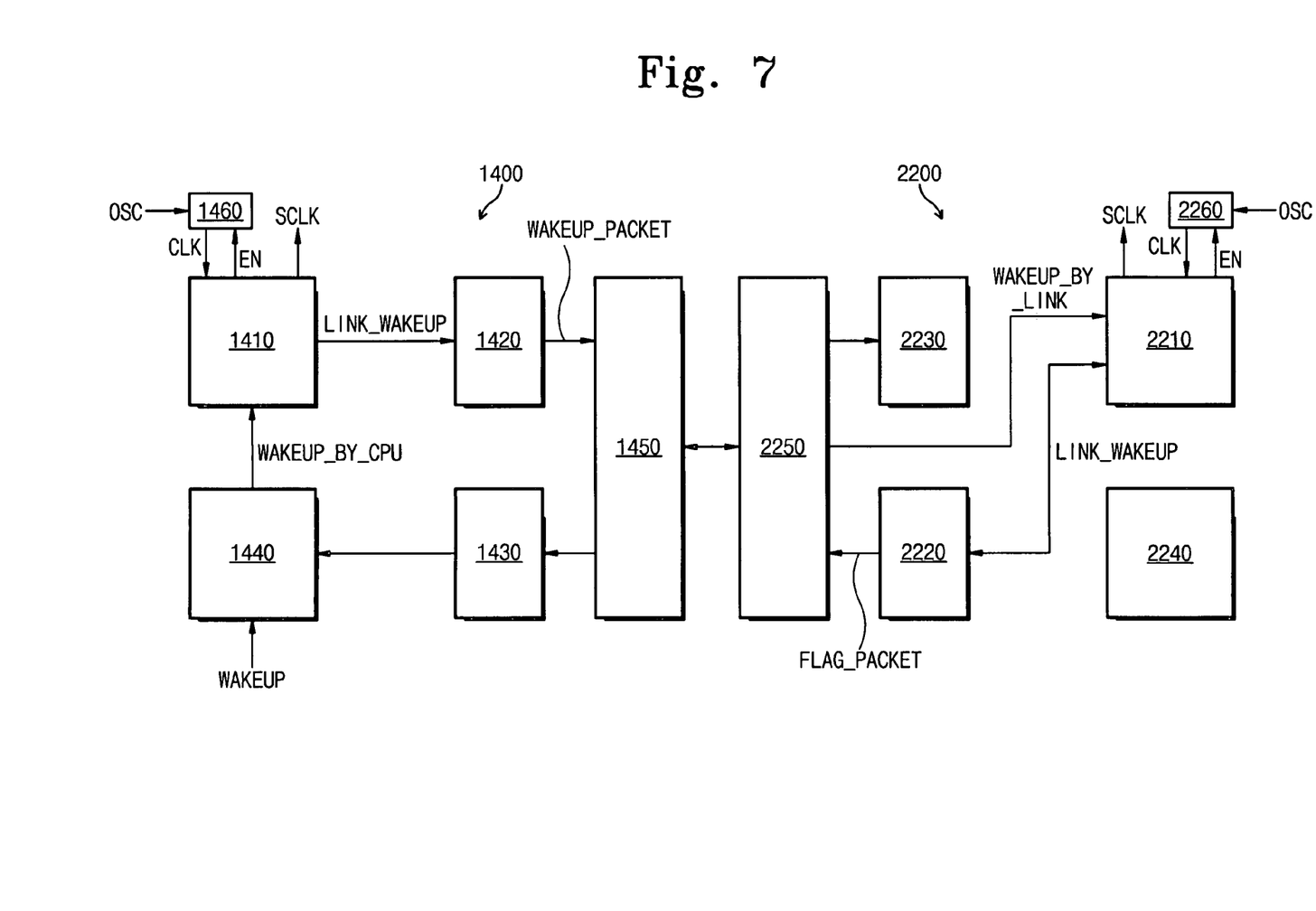
FIG. 7 is a block diagram illustrating signal flows for the signals of FIG. 6 according to another example embodiment of the present invention.

FIG. 7 is a block diagram illustrating signal flows within the first and second serial interface blocks 1400 and 2200 for the signals of FIG. 6 according to another example embodiment of the present invention.

The example process of FIG. 5 will now be described with reference to FIGS. 6 and 7.

In the example embodiment of FIG. 5, if there is an "interrupt" (e.g., a condition for triggering a release from the power saving mode or standby mode) (at S200), the power saving mode of the first serial interface block 1400 may be released by enabling the system clock signal SCLK (at S210). Then, the uplink channel may be activated so as to output packet data via the activated uplink channel (at S220). If the packet data is transferred to the second serial interface block 2200 through the uplink channel, the power saving mode of the second serial interface block 2200 may be released by enabling the system clock signal SCLK (at S230). Then, the downlink channel may be activated and flag packet data may be output via the activated downlink channel (at S240). The AP 1200 may then be informed that the first and second serial interface blocks 1400 and 2200 have been released from the power saving mode (at S250) (e.g., via an evaluation of the suspension bits of the registered stored therein).

A more detailed description of the example process of FIG. 5 will now be given with respect to FIGS. 6 and 7.

In the example embodiment of FIG. 5 with reference to FIGS. 6 and 7, the interface unit 1440 of the first serial interface block 1400 may generate a control signal WAKE-UP_BY_CPU in response to an interrupt information signal WAKEUP provided from the AP 1200. The system controller 1410 may be released from the power saving mode if there is an input of the control signal WAKEUP_BY_CPU. Concurrently, the system controller 1410 may internally generate a clock enable signal CLK_EN to activate the system clock signal SCLK. The activation of the system clock signal SCLK may be performed in any of numerous ways. For example, if the clock generator 1460 becomes inactive in the power saving mode, the system controller 1410 may first inactivate the clock generator 1460. The clock generator 1460 may output the clock signal CLK in response to an oscillation signal OSC provided from an external device and the system controller 1410 may generate the system clock signal SCLK in response to the clock signal CLK. Alternatively, if the clock generator 1460 is active in the power saving mode, the system controller 1410 may generate the system clock signal SCLK, based on the clock signal CLK provided from the clock generator 1460, in response to an input of the control signal WAKEUP_BY_CPU.

In the example embodiment of FIG. 5 with reference to FIGS. 6 and 7, the system controller 1410 may generate a control signal LINK_WAKEUP. The suspension state of the host controller 1420 may be released by an activation of the control signal LINK_WAKEUP. For example, the host controller 1420 may activate the uplink channel in response to the activation of the control signal LINK_WAKEUP. The host controller 1420 may output a wakeup packet WAKEUP_

PACKET through the activated uplink channel. The wakeup packet WAKEUP_PACKET may be serialized via the LVDS I/O unit 1450.

In the example embodiment of FIG. 5 with reference to FIGS. 6 and 7, the LVDS I/O unit 2250 of the second serial interface block 2200 may generate a control signal WAKE-UP_BY_LINK in response to the wakeup packet WAKEUP_PACKET transferred through the uplink channel. The system controller 2210 may be released from the power saving mode if there is an input of the control signal WAKEUP_BY_LINK. Concurrently, the system controller 2210 may internally generate a clock enable signal CLK_EN to activate the system clock signal SCLK. The activation of the system clock signal SCLK may be performed in any of numerous ways. For example, if the clock generator 2260 is inactive in the power saving mode, the system controller 2210 may first inactivate the clock generator 2260. Thereby, the clock generator 2260 may output the clock signal CLK in response to the oscillation signal OSC provided from an external device and the system controller 2210 may generate the system clock signal SCLK in response to the clock signal CLK. Alternatively, if the clock generator 2260 is active in the power saving mode, the system controller 2210 may generate the system clock signal SCLK, based on the clock signal CLK provided from the clock generator 2260, in response to an input of the control signal WAKEUP_BY_LINK.

In the example embodiment of FIG. 5 with reference to FIGS. 6 and 7, after enabling the system clock signal SCLK, the system controller 2210 may output a control signal LINK_WAKEUP to the host controller 2220. The suspension state of the host controller 2220 may be released by the control signal LINK_WAKEUP, which may thereby activate the downlink channel. The host controller 2220 may output flag packet FLAG_PACKET through the activated downlink channel. The flag packet FLAG_PACKET may be serialized via the LVDS I/O unit 2250. The flag packet FLAG_PACKET may be transferred to the interface unit 1440 via the LVDS I/O unit 1450 and the client controller 1430 of the first serial interface block 1400. The interface unit 1440 may cause an "interrupt" in response to the flag packet FLAG_PACKET. The interface unit 1440 may indicate or inform, to the AP 1200, that the first and second serial interface blocks 1400 and 2200 have each been released from the power saving mode. Then, the AP 1200 may enable the interface functions of the first and second serial interface blocks 1400/2200 which were previously disabled in the power saving mode.

Figure 8:
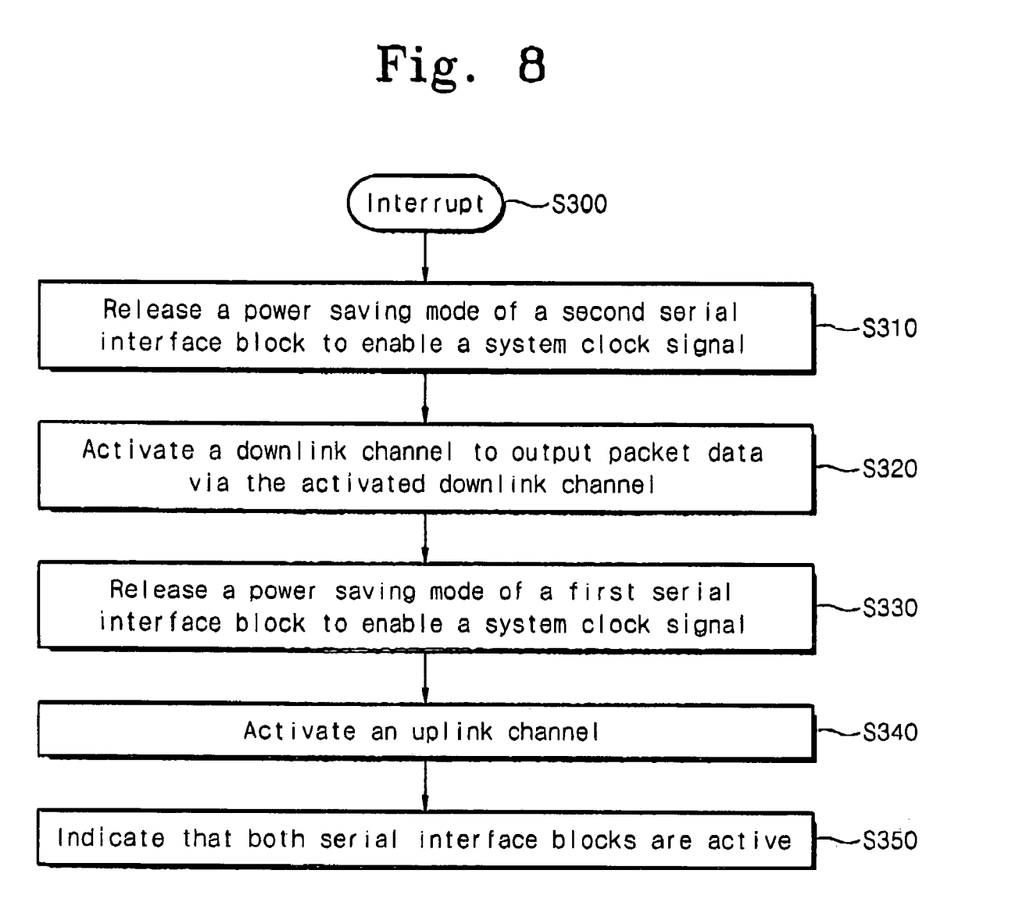
FIG. 8 is a flow chart illustrating another process of releasing the power saving mode according to another example embodiment of the present invention.

FIG. 8 is a flow chart illustrating another process of releasing the power saving mode according to another example embodiment of the present invention.

Figure 9:
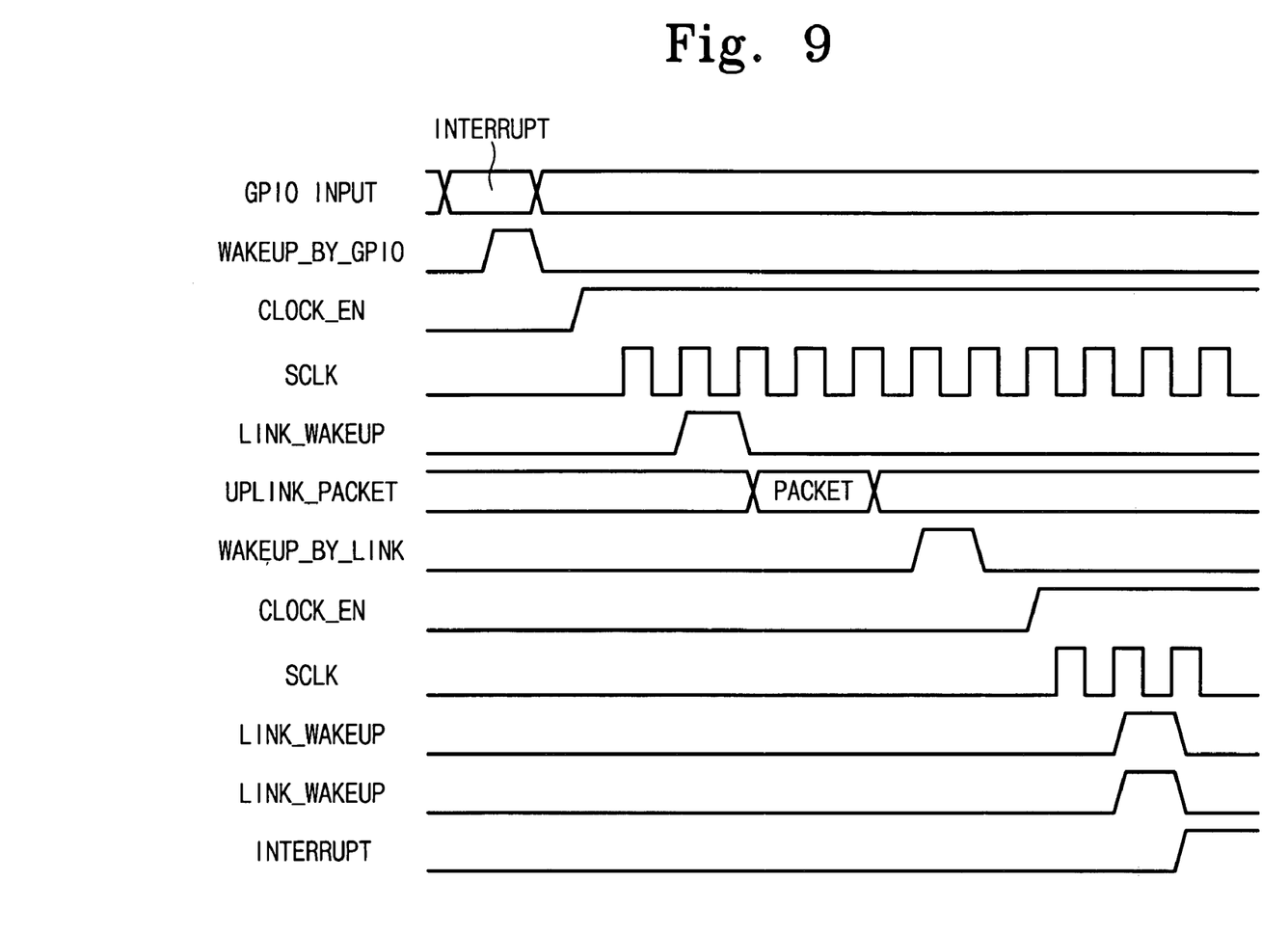
FIG. 9 is a timing diagram illustrating signal state transitions for signals during the process of FIG. 8 according to another example embodiment of the present invention.

FIG. 9 is a timing diagram illustrating signal state transitions for signals within the first and second serial interface blocks 1400 and 2200 during the process of FIG. 8 according to another example embodiment of the present invention.

Figure 10:
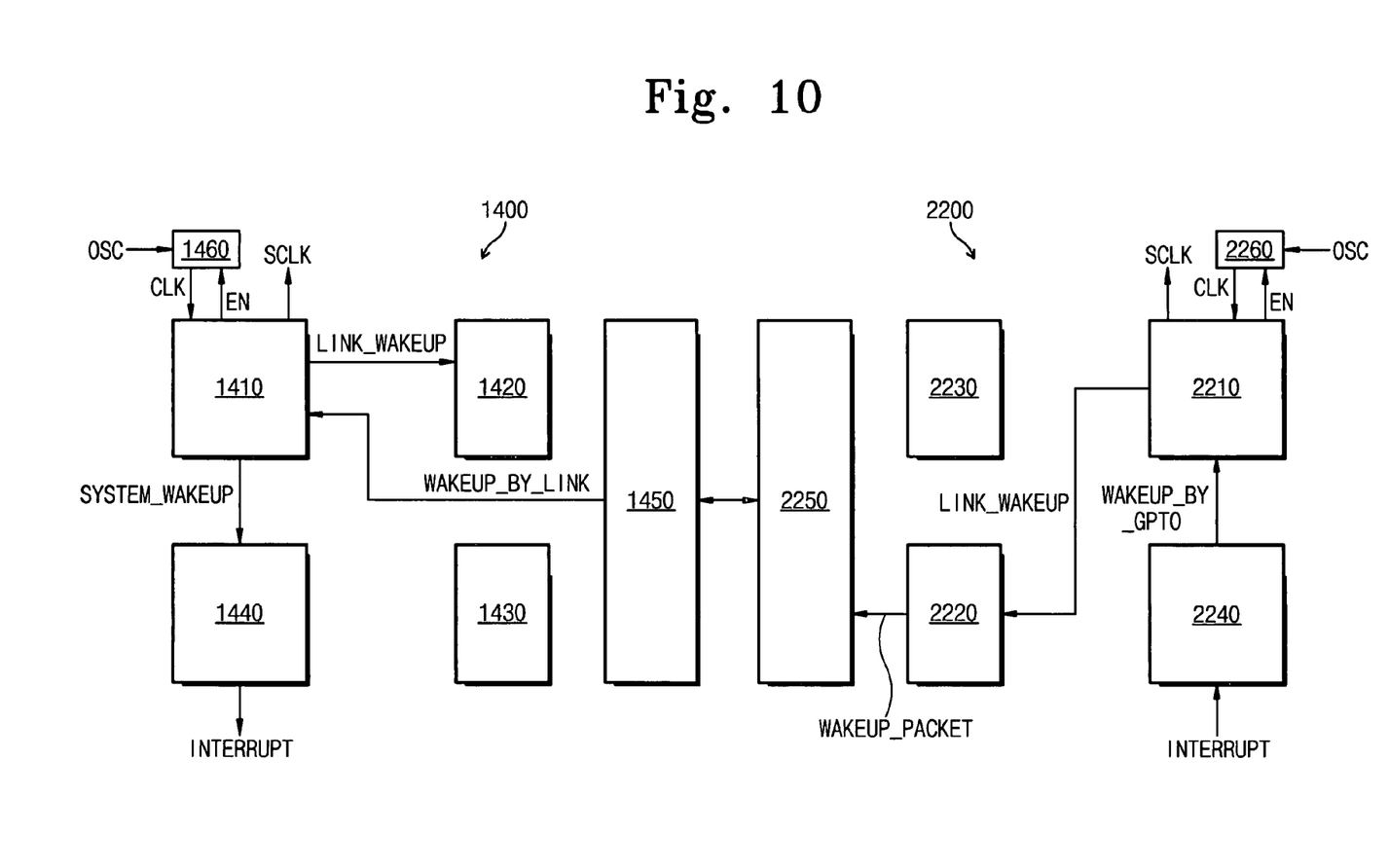
FIG. 10 is a block diagram illustrating signal flows for the signals of FIG. 9 according to another example embodiment of the present invention.

FIG. 10 is a block diagram illustrating signal flows within the first and second serial interface blocks 1400 and 2200 for the signals of FIG. 9 according to another example embodiment of the present invention.

The example process of FIG. 8 will now be described with reference to FIGS. 6 and 7.

In the example embodiment of FIG. 10, if there is an "interrupt from an external interrupt source (at S300), the power saving mode of the second serial interface block 2200 may be released so as to enable the system clock signal SCLK (at S310). A downlink channel may then be activated so as to output packet data via the activated downlink channel (at S320). If the packet data is transferred to the first serial interface block 1400 through the downlink channel, the power saving mode of the first serial interface block 1400 may be released so as to enable the system clock signal SCLK (at S330). Then, an uplink channel may be activated (at S340) and the AP 1200 may be informed that the first and second serial interface blocks 1400 and 2200 have been released from the power saving mode (at S350) (e.g., based on the suspension state bit).

A more detailed description of the example process of FIG. 8 will now be given with respect to FIGS. 9 and 10.

In the example embodiment of FIG. 8, with reference to FIGS. 9 and 10, the interface unit 2240 (e.g., a GPIO interface) of the second serial interface block 2200 may generate a control signal WAKEUP_BY_GPIO in response to an interrupt information signal provided from an external interrupt source. The system controller 2210 may be released from the power saving mode if there is an input of the control signal WAKEUP_BY_GPIO. Concurrently, the system controller 2210 may internally generate a clock enable signal CLK_EN to activate the system clock signal SCLK. The activation of the system clock signal SCLK may be performed in any of numerous ways. For example, if the clock generator 1460 is inactive in the power saving mode, the system controller 2210 may first inactivate the clock generator 2260. Thereby, the clock generator 2260 may output the clock signal CLK in response to the oscillation signal OSC provided from an external device and the system controller 2210 may generate the system clock signal SCLK in response to the clock signal CLK. Alternatively, if the clock generator 2260 is active in the power saving mode, the system controller 2210 may generate the system clock signal SCLK, based on the clock signal CLK provided from the clock generator 2260, in response to an input of the control signal WAKEUP_BY_GPIO.

In the example embodiment of FIG. 8, with reference to FIGS. 9 and 10, the system controller 2210 may generate a control signal LINK_WAKEUP. The suspension state of the host controller 2220 may be released in accordance with the control signal LINK_WAKEUP. The host controller 2220 may activate the downlink channel in response to the activation of the control signal LINK_WAKEUP. The host controller 2220 may output a wakeup packet WAKEUP_PACKET through the activated downlink channel. The wakeup packet WAKEUP_PACKET may be serialized via the LVDS I/O unit 2250.

In the example embodiment of FIG. 8, with reference to FIGS. 9 and 10, the LVDS I/O unit 1450 of the first serial interface block 1400 may generate a control signal WAKE-UP_BY_LINK in response to the wakeup packet WAKEUP_PACKET transferred through the downlink channel. The system controller 1410 may be released from the power saving mode if there is an input of the control signal WAKEUP_BY_LINK. Concurrently, the system controller 1410 may internally generate a clock enable signal CLK_EN to activate the system clock signal SCLK. The activation of the system clock signal SCLK may be performed in any of numerous ways. For example, if the clock generator 1460 is inactive in the power saving mode, the system controller 1410 may first inactivate the clock generator 1460. The clock generator 1460 may output the clock signal CLK in response to the oscillation signal OSC provided from an external device and the system controller 1410 may generate the system clock signal SCLK in response to the clock signal CLK. Alternatively, if the clock generator 1460 is active in the power saving mode, the system controller 1410 may generate the system clock signal SCLK, based on the clock signal CLK provided from the clock generator 1460, in response to an input of the control signal WAKEUP_BY_LINK.

In the example embodiment of FIG. 8, with reference to FIGS. 9 and 10, after enabling the system clock signal SCLK, the system controller 1410 may output a control signal LINK_WAKEUP to the host controller 1420. The suspension state of the host controller 1420 may be released by the control signal LINK_WAKEUP, thereby activating the uplink channel. Concurrently, the host controller 1420 may generate a control signal SYSTEM_WAKEUP, and the interface unit 1440 may interrupt (e.g., reactivate) in response to the control signal SYSTEM_WAKEUP. The interface unit 1440 may indicate, to the AP 1200, that the first and second serial interface blocks 1400 and 2200 have each been released from the power saving mode.

In another example embodiment of the present invention, the components of each of the first and second sub-systems 1000/2000 may be formed in independent chips, respectively, or may alternatively be integrated within a single chip. If a device including the first and second sub-systems 1000/2000 is a mobile communication device, the device may include a divided structure with top and bottom parts (e.g., the first and second sub-systems, respectively), and as such may be embodied as a folder-type mobile phone or a slide-type mobile phone.

Example embodiments of the present invention being thus described, it will be obvious that the same may be varied in many ways. For example, while above described example embodiments are directed generally to a system employing LVDS protocols, it will be readily appreciated that the above described example embodiments of the present invention may be easily adapted for use in systems employing other signaling protocols.

Such variations are not to be regarded as a departure from the spirit and scope of example embodiments of the present invention, and all such modifications as would be obvious to one skilled in the art are intended to be included within the scope of the following claims.

What is claimed is:

1. A method of controlling power consumption in a system including first and second serial interface blocks, comprising:
  transitioning the first serial interface block to a power saving mode in response to a status of a first transmission channel, the first transmission channel configured to forward information from the first serial interface block to the second serial interface block;
  transitioning the second serial interface block to the power saving mode in response to a status of a second transmission channel, the second transmission channel configured to forward information from the second serial interface block to the first serial interface block;
  disabling external interface functions of the first and second serial interface blocks;
  setting the first transmission channel into a suspension state, the first transmission channel associated with a higher impedance during the suspension state, the suspension state being the status which triggers the transition of the first serial interface block to the power saving mode;
  setting the second transmission channel into the suspension state, the second transmission channel associated with a higher impedance during the suspension state, the suspension state being the status which triggers the transition of the second serial interface block to the power saving mode;
  releasing the first serial interface block from the power saving mode in response to a first interrupt;
  activating the second transmission channel;
  outputting packet data through the activated second transmission channel;
  releasing the second serial interface block from the power saving mode upon receipt of packet data via the activated second transmission channel;
  activating the first transmission channel;
  outputting flag packet data through the activated first transmission channel; and
  generating a second interrupt indicating that the first and second serial interface blocks have been released from the power saving mode based on the output flag packet data,
    wherein first and second system clock signals of the first and second serial interface blocks, respectively, are each disabled during the power saving mode.

2. The method of claim 1, wherein activating the first transmission channel includes releasing a suspension state of a host controller included in the second serial interface block.

3. The method of claim 1, wherein activating the second transmission channel includes releasing a suspension state of a host controller included in the first serial interface block.

4. The method of claim 1, wherein the first system clock signal is enabled upon the first serial interface block being released from the power saving mode.

5. The method of claim 1, wherein the second system clock signal is enabled upon the second serial interface block being released from the power saving mode.

6. A method of controlling power consumption in a system including first and second serial interface blocks, comprising:
  transitioning the first serial interface block to a power saving mode in response to a status of a first transmission channel, the first transmission channel configured to forward information from the first serial interface block to the second serial interface block;
  transitioning the second serial interface block to the power saving mode in response to a status of a second transmission channel, the second transmission channel configured to forward information from the second serial interface block to the first serial interface block;
  disabling external interface functions of the first and second serial interface setting the first transmission channel into a suspension state, the first transmission channel associated with a higher impedance during the suspension state, the suspension state being the status which triggers the transition of the first serial interface block to the power saving mode;
  setting the second transmission channel into the suspension state, the second transmission channel associated with a higher impedance during the suspension state, the suspension state being the status which triggers the transition of the second serial interface block to the power saving mode;
  releasing the second serial interface block from the power saving mode in response to a first interrupt;
  activating the first transmission channel;
  outputting packet data through the activated first transmission channel;
  releasing the first serial interface block from the power saving mode upon receipt of packet data via the activated first transmission channel; and
  activating, after releasing the first serial interface block from the power saving mode, the second transmission channel and generating a second interrupt indicating that the first and second serial interface blocks have been released from the power saving mode based on the flag packet data, wherein first and second system clock signals of the first and second serial interface blocks, respectively, are each disabled during the power saving mode.

7. The method of claim 6, wherein the first transmission channel is activated by releasing a suspension state of a host controller included in the second serial interface block.

8. The method of claim 6, wherein the second transmission channel is activated by releasing a suspension state of a host controller included in the first serial interface block.

9. The method of claim 6, wherein the first system clock signal is enabled upon the first serial interface block being released from the power saving mode.

10. The method of claim 6, wherein the second system clock signal is enabled upon the second serial interface block being released from the power saving mode.

11. A system, comprising:
a first serial interface block transitioning to a power saving mode in response to a status of a first transmission channel, the first transmission channel configured to forward information from the first serial interface block to a second serial interface block;
the second serial interface block transitioning to the power saving mode in response to a status of a second transmission channel, the second transmission channel configured to forward information from the second serial interface block to the first serial interface block, each of the first and second serial interface blocks including an interface unit, a system controller, a host controller, a serial interface unit, and a client controller, each of which are electrically connected with each other via an internal bus; and
an application processor disabling external interface functions of the first and second serial interface blocks, wherein
information associated with the power saving mode is stored in the host controller for at least one of the first and second serial interface blocks and the first transmission channel is set into the suspension state based on at least a portion of the information stored in the host controller of the second serial interface block; and
wherein, transitioning to the power saving mode includes setting the first transmission channel into a suspension state, the first transmission channel associated with a higher impedance during the suspension state, the suspension state being the status which triggers the transition of the first serial interface block to the power saving mode and setting the second transmission channel into the suspension state, the second transmission channel associated with a higher impedance during the suspension state, the suspension state being the status which triggers the transition of the second serial interface block to the power saving mode.

12. The system of claim 11, wherein first and second system clock signals of the first and second serial interface blocks, respectively, are each disabled during the power saving mode.

13. The system of claim 11, wherein the second transmission channel is set into the suspension state based on at least a portion of the information stored in the host controller of the first serial interface block.

14. The system of claim 11, wherein determining whether the first transmission channel is set into the suspension state is performed by detecting whether an output of the host controller of the second serial interface block has a higher impedance level.

15. The system of claim 11, wherein the system controller of the second serial interface block performs an interrupt on at least a portion of the functionality of the second serial interface block if the first transmission channel is set into the suspension state.

16. The system of claim 15, wherein determining whether the first transmission channel is set into the suspension state is performed by detecting whether there an interrupt is present.

17. The system of claim 11, the first and second serial interface blocks each store information associated with the power saving mode before disabling the external interface functions thereof.

18. The system of claim 11, wherein each of the first and second serial interfaces unit includes a lower-voltage differential signaling interface unit.

19. The system of claim 11, wherein the application processor releases the first serial interface block from the power saving mode in response to an interrupt in the power saving mode.

20. The system of claim 19, wherein the second transmission channel is activated and packet data is output through the activated second transmission channel in response to the first serial interface block being released from the power saving mode.

21. The system of claim 20, wherein the second serial interface block is released from the power saving mode in response to the packet data from the first serial interface block.

22. The system of claim 21, the first transmission channel is activated and flag packet data through the activated first transmission channel in response to the second serial interface block being released from the power saving mode.

23. The system of claim 22, wherein the first serial interface block informs the application processor that the first and second serial interface blocks have each been released from the power saving mode in response to the flag packet data being output.

24. The system of claim 11, wherein the second serial interface block is released from the power saving mode in response to an interrupt from an external interrupt source.

25. The system of claim 24, wherein the first transmission channel is activated and packet data is transferred to the first serial interface block through the activated first transmission channel in response to the second serial interface block being released from the power saving mode.

26. The system of claim 25, wherein the first serial interface block is released from the power saving mode in response to the packet data received from the second serial interface block.

27. The system of claim 26, wherein after the first serial interface block is released from the power saving mode, the first serial interface block activates the second transmission channel and informs the application processor that the first and second serial interface blocks have each been released from the power saving mode.

28. The system of claim 11, further comprising: user interface block communicating with the second serial interface block.

* * * * *